United States Patent [19]
Cubberly, Jr.

[11] 4,353,122
[45] Oct. 5, 1982

[54] DIFFERENTIAL NOISE LOGGING METHOD AND APPARATUS

[75] Inventor: Walter E. Cubberly, Jr., Houston, Tex.

[73] Assignee: Schlumberger Technology Corporation, Houston, Tex.

[21] Appl. No.: 151,386

[22] Filed: May 19, 1980

[51] Int. Cl.$^3$ .............................................. G01V 1/40
[52] U.S. Cl. ...................................... 367/25; 367/35; 367/86; 73/40.5 A
[58] Field of Search .................. 367/25, 26, 27–35, 367/86, 911, 912; 181/102–106; 73/40.5 A

[56] References Cited

U.S. PATENT DOCUMENTS

| | | |
|---|---|---|
| 3,413,653 | 11/1968 | Wood ............................. 73/40.5 A |
| 3,478,576 | 11/1969 | Bogle ............................. 73/40.5 A |
| 3,517,546 | 6/1970 | Fraser ............................. 73/40.5 A |
| 4,114,721 | 9/1978 | Glenn, Jr. ............................. 367/32 |

Primary Examiner—Howard A. Birmiel

[57] ABSTRACT

The present invention provides a method and apparatus of differential noise logging. The apparatus includes a mandrel supporting at least two differentially connected acoustic transducers. The noise signals detected by the transducers are filtered, processed by RMS circuits and then subtracted one from another to effectively eliminate road noise. A telemetry system is utilized to send the signals uphole for recording. The differential logging method includes continuous movement of the differential noise logging tool to identify producing perforations, distinguish flow through perforations from flow being casing, and to identify sand jet entry into a cased well.

9 Claims, 12 Drawing Figures

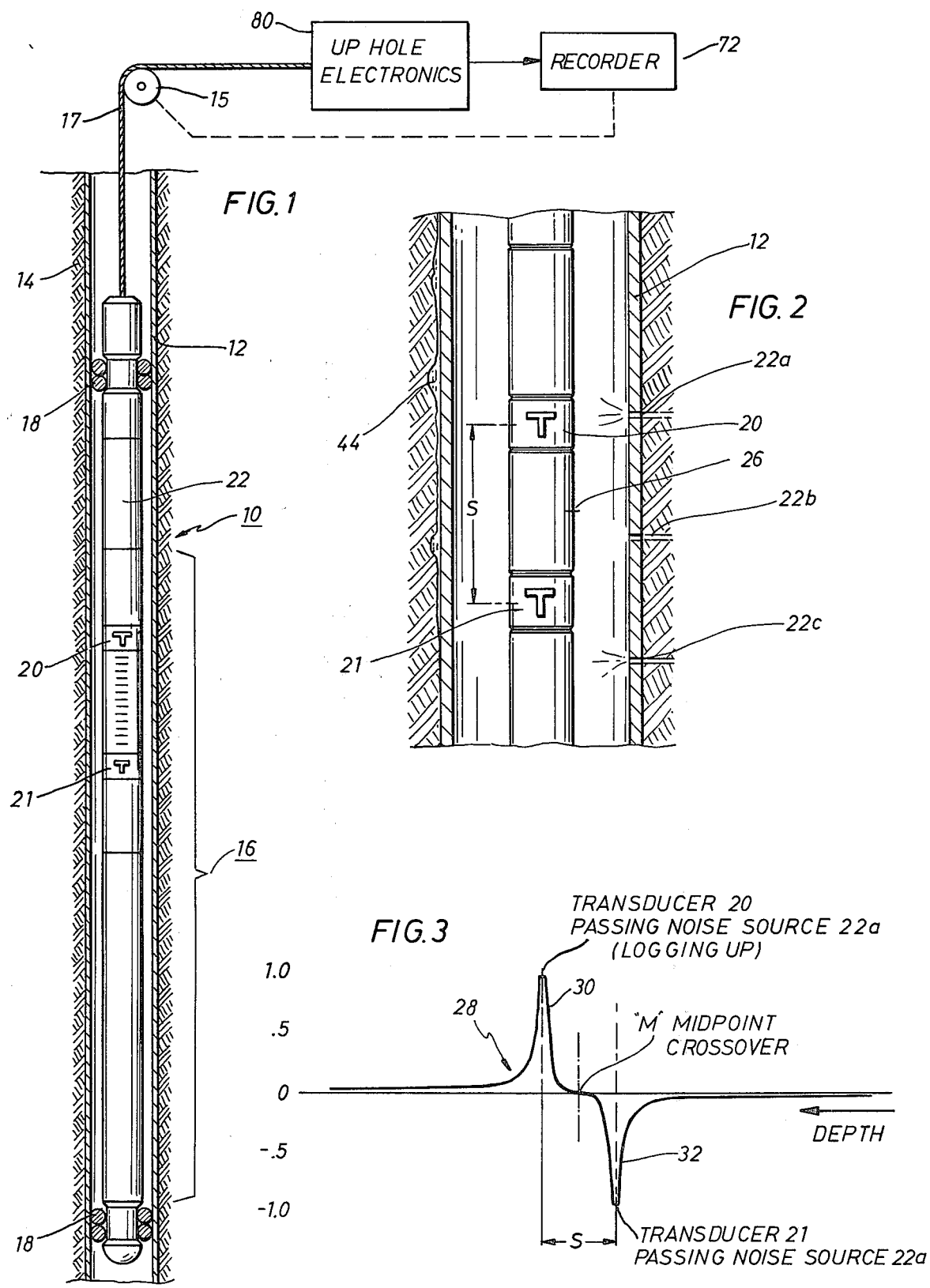

SINGLE TRANSDUCER LOG

DIFFERENTIAL LOG

BEHIND CASING NOISE

PERFORATION NOISE

DIFFERENTIAL NOISE LOGGING METHOD AND APPARATUS

BACKGROUND OF THE INVENTION

The invention relates generally to logging in boreholes. Specifically, the invention relates to noise logging in oil and gas wells.

The flow of fluids across a pressure differential generates noise as the mechanical energy is converted to acceleration or turbulence. Borehole noise logging, a measurement of acoustic energy, is useful in the qualitative evaluation of fluid flow. In uncased boreholes, the noise log serves as a detection means for natural flow.

For some open hole boreholes, it is important to know whether or not there is sufficient porosity and extent to make a commercial reservoir, and then whether the reservoir when present has sufficient permeability to make the production economical. When these wells are drilled using compressed air and remain empty during the logging operation, a noise log indicating natural flow indicates that some permeability is present.

Also there are many formations which are producers only in spotty areas and are not usually considered as the primary horizon because they are a high risk situation. However, when found, these reservoirs may add substantially to the production or life of a particular well, or may be of some interest in the future. A downhole noise logging system which can detect natural flow is advantageous.

In cased wells, noise logging is valuable for identifying production through perforations, distinguishing perforation production from channel flow behind casing, and determining the presence of sand entry into the well, among other applications.

Noise logging devices used in the identification of noise sources are presently known which utilize a single transducer on a mandrel for logging through the oil well. Single transducer noise logging is discussed in an article entitled "Specialized Applications of Noise Logging," by R. M. McKinley, Society Petroleum Engineers, Paper No. 6784. Typically, the single acoustic transducer detects noise generated, for example, by a producing perforation and translates the acoustic energy into an electrical signal for transmission to the surface for recording. Using a single transducer, the log is typically created from station-by-station measurements. That is, the logging tool is periodically stopped for a reading, for example, every two feet. The periodic stopping of the device in the casing has been necessary to avoid the detection of "road noise."

Road noise is that generated within the casing by the tool itself while moving through the casing. In a single transducer device if the tool is not stationary before a reading, a true fluid flow noise signal may not be isolated and is often contaminated with the road noise signal. An important feature of the invention described below is that it allows continuous logging measurements to be made while suppressing road noise.

U.S. Pat. No. 4,114,721 issued to Edwin E. Glenn discloses a borehole noise logging system using two detectors, the signals of which are transmitted uphole and applied to an amplifier, spectrum analyzer, cross-correlator and recorder. The cross-correlator is used to provide an indication of the time differential to each transducer as a way of locating flow through or behind the well casing.

SUMMARY OF THE INVENTION

The differential noise logging tool and method of the invention provides a continuous logging way to determine whether or not perforations in a cased oil well are producing. The differential noise logging tool of the invention also provides a means of distinguishing point noise sources, such as producing perforations, from flowing fluid channel noise behind the casing wall. Further, the invention provides a way to distinguish sand jet entry into a cased well from ordinary fluid or gas entry. The invention may also be used advantageously for detecting intervals of natural flow in uncased boreholes. All the methods of noise logging according to the invention are achieved with continuous logging operations rather than slow station-by-station methods characteristic of prior art noise logging apparatus and methods, while advantageously minimizing road noise caused by the bumping and scraping of the tool during logging.

The differential noise logging tool of the invention comprises a multiple acoustic transducer system, having a least two transducers disposed on a sonde, or tool mandrel. The transducers are spaced a predetermined distance from one another on the sonde such that one transducer will detect a noise source a predetermined time before the second transducer during constant velocity through the well.

The noise signals from the transducer are each high pass filtered and then applied to a circuit for generating the root-mean-square (RMS) of the filtered noise. The RMS signals which ultimately result from each transducer are both applied to a differential amplifier where the difference between the two RMS signals is generated for telemetry to the surface. At the surface, the difference signals are recorded, either with a conventional photographic galvanometer logging recorder, or on magnetic tape, CRT, etc.

BRIEF DESCRIPTION OF THE DRAWINGS

The features and advantages of the invention will be more easily understood from the description of the invention which follows when taken in conjunction with the attached drawings in which:

FIG. 1 is a schematic view of a preferred embodiment of the differential noise logging tool according to the invention;

FIG. 2 is a schematic view of the differential noise logging tool in a cased borehole environment having perforations in the casing and channel fluid flowing behind the casing;

FIG. 3 is a graphical representation of the recorded amplitude signal generated by the differential noise logging tool versus borehole depth;

DESCRIPTION OF THE INVENTION

Figure 4A:
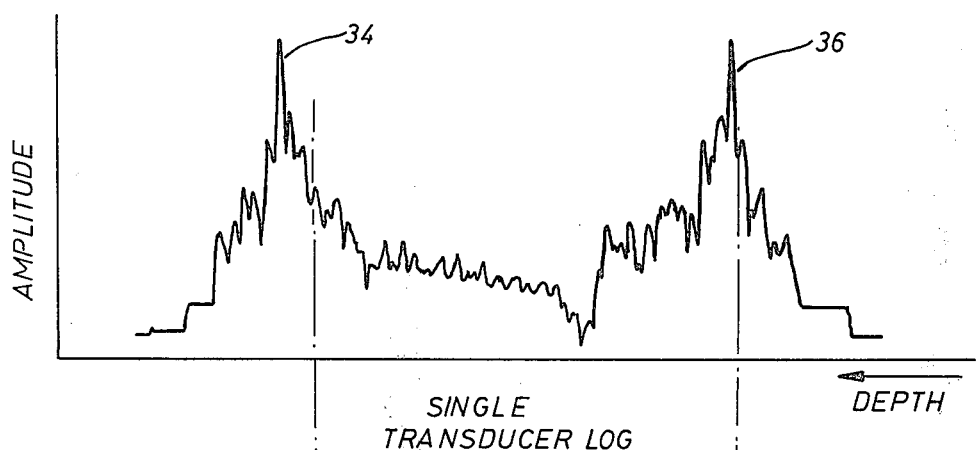
FIGS. 4a and 4b are graphical representations of a log produced by a single transducer and differential logging device respectively as a function of borehole depth.

Referring now to the drawings and more specifically to FIG. 1, a differential logging tool 10 is illustrated in a cased borehole environment. Although illustrated in a cased borehole, the noise logging system of the invention finds application for use in uncased boreholes, for identifying sources of natural flow, but many of the identification and distinguishing uses of the invention are in the cased hole environment. Consequently, for simplicity and clarity, no further illustrations of the use of the invention in open hole boreholes will be presented. Illustrating the invention in the cased hole environment in FIG. 1, the differential noise logging apparatus 10 is shown to be within casing 12 of a borehole through formations 14.

The differential noise logging tool 10 includes a tubular housing or sonde 16 normally used for supporting well logging transducers. Mounted on sonde 16 are at least two acoustic transducers 20 and 21. Preferably the transducers are ceramic acoustic transducers, but may be of other types typically used in the logging art.

The differential noise logging tool 10 further includes an electronic cartridge 22. The logging tool 10 is suspended in the well by a conventional logging cable 17 which passes over sheave wheel 15 to the uphole electronics system 80 and ultimately to a conventional well logging recorder 72 driven in synchronism with sheave wheel 15 to accurately record the noise signals as a function of the depth of logging tool 10. Logging tool 10 further includes standoff centralizers 18 to minimize bumping and scraping noises against casing 12 as the tool moves through the well. The electronic cartridge 22, described in further detail below, takes the output of each transducer 20, 21 and generates a differential output.

In operation, the differential noise logging tool 10 is preferably pulled up the casing in a continuous manner. Stationary readings may be made, and logging down is, of course, possible. The transducers 20 and 21 generate electrical signal outputs in response to detecting a noise source such as producing perforations 22a and 22c illustrated in FIG. 2. Since transducers 20, 21 are spaced apart a predetermined distances on sonde 16, each will detect the point noise source from a perforation, 22a for example, at different times as each in turn pass the perforations during movement up the well. As indicated above and explained in more detail below, the individual signals are processed and transmitted in a differential format uphole for recording.

FIG. 2 illustrates a series of perforations 22a-c, only two of which (22a, 22c) are producing. The uppermost transducer 20 in FIG. 2 is shown at a time of alignment opposite to producing perforation 22a. Second transducer 21 detects the noise from producing perforation 22a when the tool has moved up a distance equal to the transducer spacing S.

FIG. 3 illustrates a typical recorded log 28 of the differential output of transducer pair 20, 21 logging past a noise source (such as perforation 22a, FIG. 2). The log 28 illustrates a double pulse, or doublet, representative of the amplitude of the sound detected by transducers 24 and 26 passing the noise point source.

Assuming a typical logging up mode, transducer 20, while passing flowing fluid entering perforation 22a, receives a much larger signal than that received at transducer 21 spaced a distance S away. As shown in FIG. 3, peak 30 is proportional to the differential output between transducers 20 and 21. As transducers 20 and 21 continue moving up, the midpoint 26 between them becomes aligned with noise from perforation 22a where the received signal from both transducers is equal. The differential output is caused to cross the zero level of the log as indicated at point M, the midpoint crossover of the log of FIG. 3. As the transducers continue upward, the differential output creates the peak 32, of reversed polarity to peak 30, as transducer 21 becomes aligned with noise source from perforation 22a. The recorder 72 driven in synchronism with the movement of logging cable 17 over sheave 15 records the double peaks 30 and 32 as a function of depth in the well.

Figure 4B:
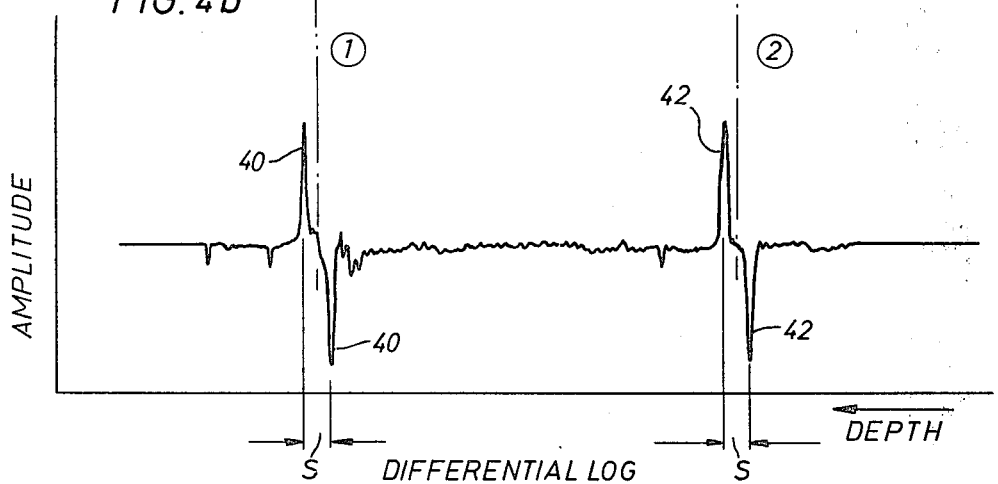

FIG. 4a illustrates the output of a single acoustic transducer as it passes two noise sources. Peaks 34 and 36 occur approximately at the depth locations of the noise sources, but as illustrated are contaminated with large quantities of noise, a large portion of which may be road noise. FIG. 4b illustrates the differential output of two transducers passing the same locations as those illustrated in FIG. 3a and illustrates the elimination of a large percent of the noise associated from the output of the single transducer. Doublets 40 and 42 confirm that the noise present in the casing at depths 1 and 2 is from a fixed noise source, because there is a specific spacing between the doublets, S, corresponding to the spacing between the transducers. Also it can be inferred that the noise is being produced continuously, because the noise peaks are generated at two different times: when the upper transducer passes the noise source and later when the lower transducer passes the source.

One feature of the invention is its use in identifying producing perforations. The method is to align the log of the differential outputs as illustrated in FIG. 3 with the known locations of perforations previously made in the casing. The existence of the characteristic doublets at locations of known perforations confirms that the perforation is producing oil or gas. If the characteristic doublet does not occur, it may be inferred that the perforation is not producing properly because no noise is being produced from the perforation.

Figure 5A:
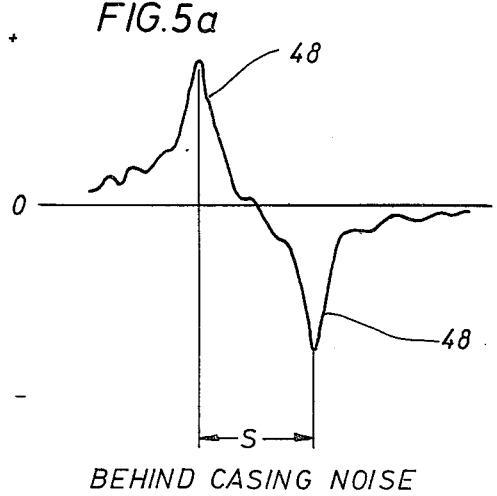
FIGS. 5a and 5b are graphical representations of differential noise logs depicting fluid flow behind casing noise and perforation noise respectively.
Figure 5B:
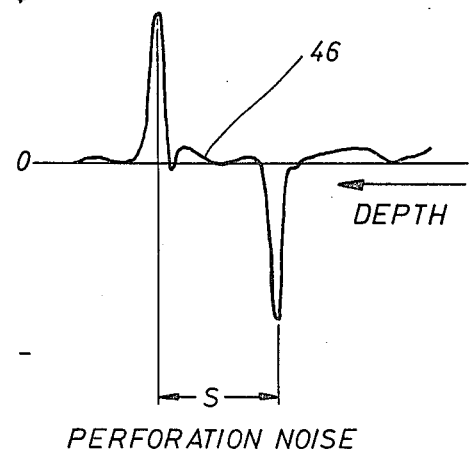

Another feature of the invention is the use of the differential noise logging tool 10 to distinguish noise produced by channel flows behind casing and noise produced at substantially a point source such as through a perforation. Channel flow behind casing may extend several feet in the axial direction at a particular location in the well. FIGS. 5a and 5b illustrate graphical representations of the differences in detection of a channel flow behind casing and a point source, as in a perforation or defect. Since the noise from a point source becomes diffused by distance from the transducer, the base line of the log 46 of FIG. 5b is at a substantially zero amplitude. However, if a channel flow behind casing exists, the noise is generated continuously over a large axial distance and the zero crossing portion of the log between the peaks of the doublet 48 connects the peaks in a sloping manner rather than returning to a substantially zero amplitude as for the case of the point source log of FIG. 5b. A doublet will occur in both the detection of channel fluid flow and the point source flow. The existence of channel flow behind casing is further characterized by the longer slopes leading to peaks 48, both on approaching the channel flow noise and leaving it while logging with the differential noise logging tool 10 of the invention.

Figure 6A:
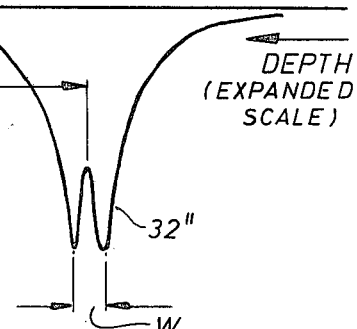
FIGS. 6a and 6b illustrate an alternative sonde, especially adapted as for detection of sand entry through casing, as part of the differential noise logging tool of FIG. 1.

FIG. 6 illustrates another embodiment of the invention particularly adapted for the detection of sand entry in cased wells. Another sonde 16', generally of the same dimensions as shown in FIG. 1 and adapted for mating with electronics cartridge 22, is provided in which rubber coverings 80, 81 are placed over part of transducer housing partially covering transducers 20, 21. The rubber covering preferably is about one-eighth inch thick and extends substantially the entire axial extent of the cylindrical transducer.

Figure 6B:
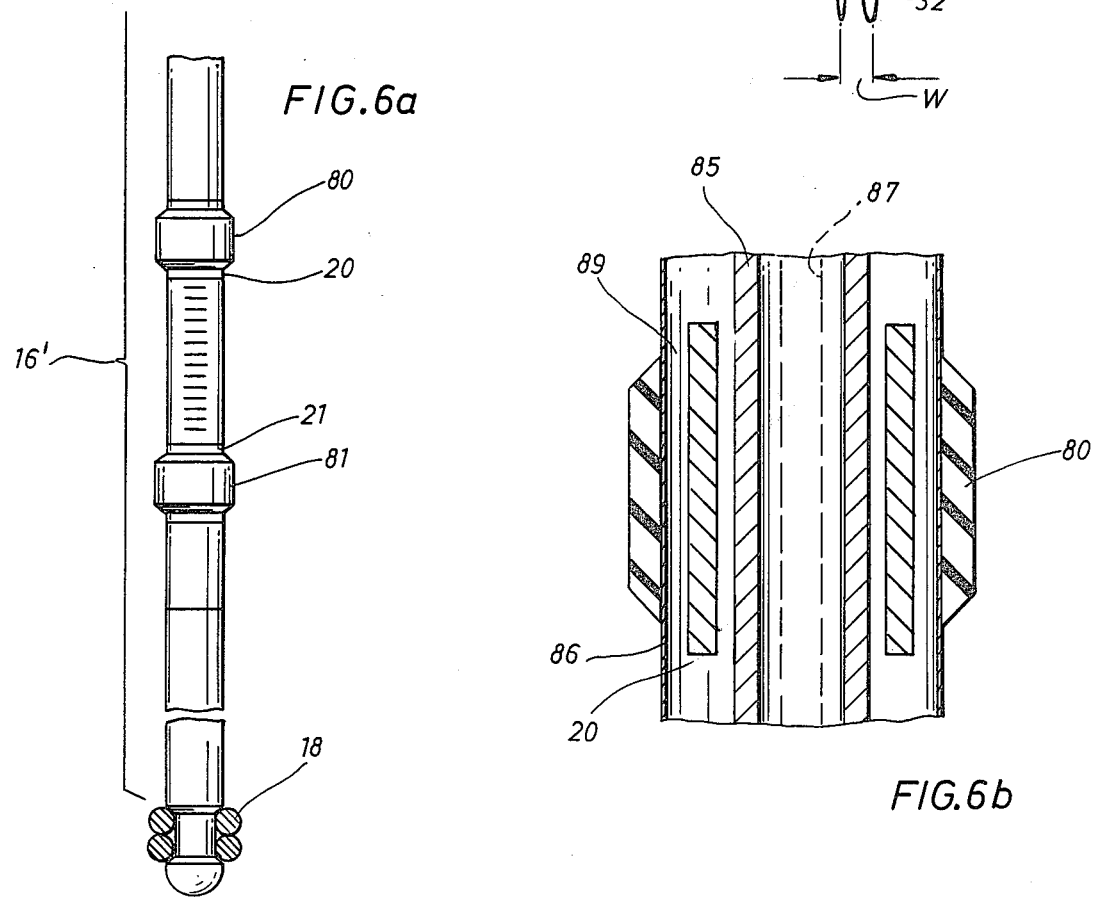

FIG. 6b illustrates the construction of one of the sand impact transducers 20, 21 with rubber coverings 80, 81. Transducer 20, cylindrical in shape, is placed axially about steel mandrel 85 in an oil filled annulus defined between outer thin tubular metal diaphragm 86 and steel mandrel 85. Electrical conductors 87 shown dotted pass through the interior of mandrel 85 for connection to the other transducer, 81 for example.

Rubber coverings 80, 81 preferably should be about 65 to 70 durometer hardness (relatively soft) and should be of a grade which can withstand the downhole well logging environment. Neoprene rubber is preferred for this use.

Figure 7A:
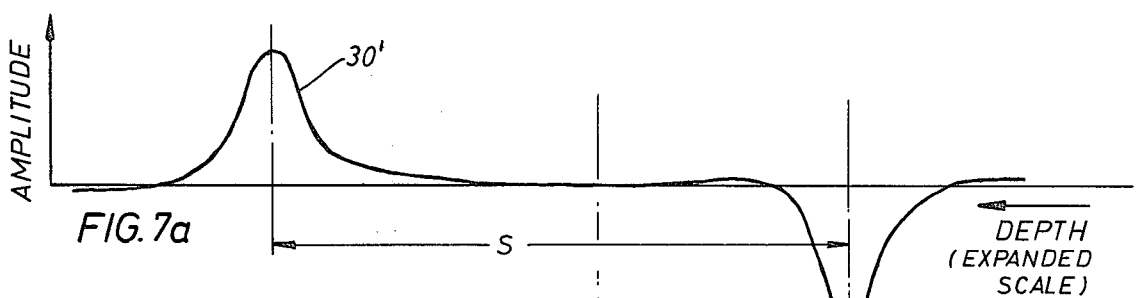
FIGS. 7a and 7b illustrate outputs from the alternative sand detecting sonde respectively for the case of fluid entry only and then for fluid and sand jet entry; and, FIG. 8 is a block diagram of electronic circuitry used to generate signals of the invention and to transmit them to the surface for recording.
Figure 7B:
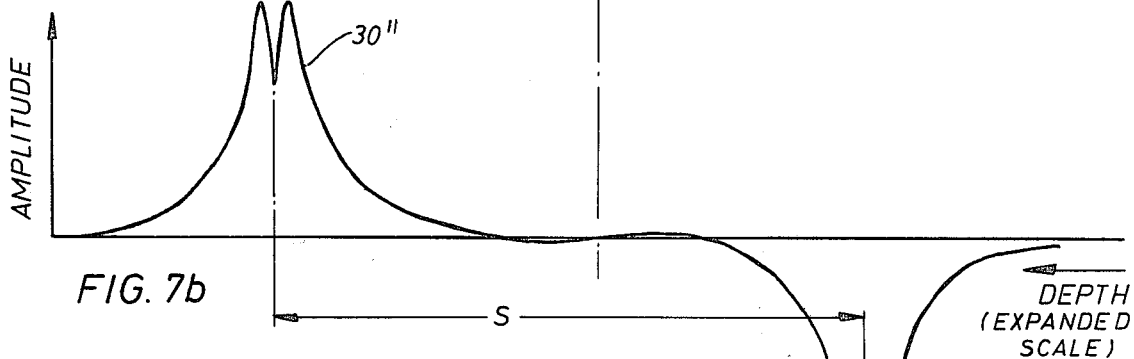

FIGS. 7a and 7b illustrate the characteristic output of the differential noise logging tool while using sonde 16', the transducers of which are likewise connected to generate a differential output. FIG. 7a illustrates the characteristic doublet pulses 30' and 32' due to fluid entry alone, as through a perforation. The acoustic impedances of the oil in chamber 89 and the rubber cover 80 are very nearly the same; therefore, the transmission of fluid jet noise is not substantially attenuated by the presence of the rubber covering.

When a high velocity sand grain enters the well and strikes the metallic part of sonde 16', a hammerlike noise is created (on a very small scale for each grain, of course). Multiplied many times for the case of a jet of sand grains, the generated acoustic noise on the metallic housing passes through thin metal diaphragm 86 (FIG. 6b) to the transducer 20 in oil filled chamber 89. The rapid repeated impacts of the sand grains generate an acoustic noise signal at each transducer 20 and 21 as they in turn pass the sand jet entry in a fashion similar to the noise produced from fluid entry through a point source. However, when the sand grains impact on the soft resilient rubber surface coverings 80 or 81, the noise is substantialy reduced in intensity in the same manner as a hammer blow on a surface covered with rubber. Thus, the noise level generated by a sand grain jet striking the sonde is substantially reduced when the rubber coated section of the sonde passes through the jet.

Conversely, the noise of oil and/or gas flowing through a perforation is generated by the pressure drop and flow velocity across the perforation. The acoustic energy generated travels through the well fluid and is transmitted into the oil filled transducer chamber 89 through tubular metal diaphragm 86.

FIG. 7b illustrates the characteristic noise log generated by the differential noise logging tool 10 with sonde 16' in place. A small twin peak is produced in each pulse 30" and 32" of width w, the width between the twin peaks being substantially the same as the axial dimension of the rubber cover 80. The magnitude of the doublet signals 30" and 32" due to fluid and jet entry from a point source such as a perforation is also greater than that of fluid entry alone as illustrated in FIG. 7b. Thus, an advantageous feature of the invention when sonde 16' is used with differential noise logging tool 10 is in identifying sand jet entries by the characteristic double pulse, each pulse having a twin peak as illustrated in FIG. 7b.

Figure 8:
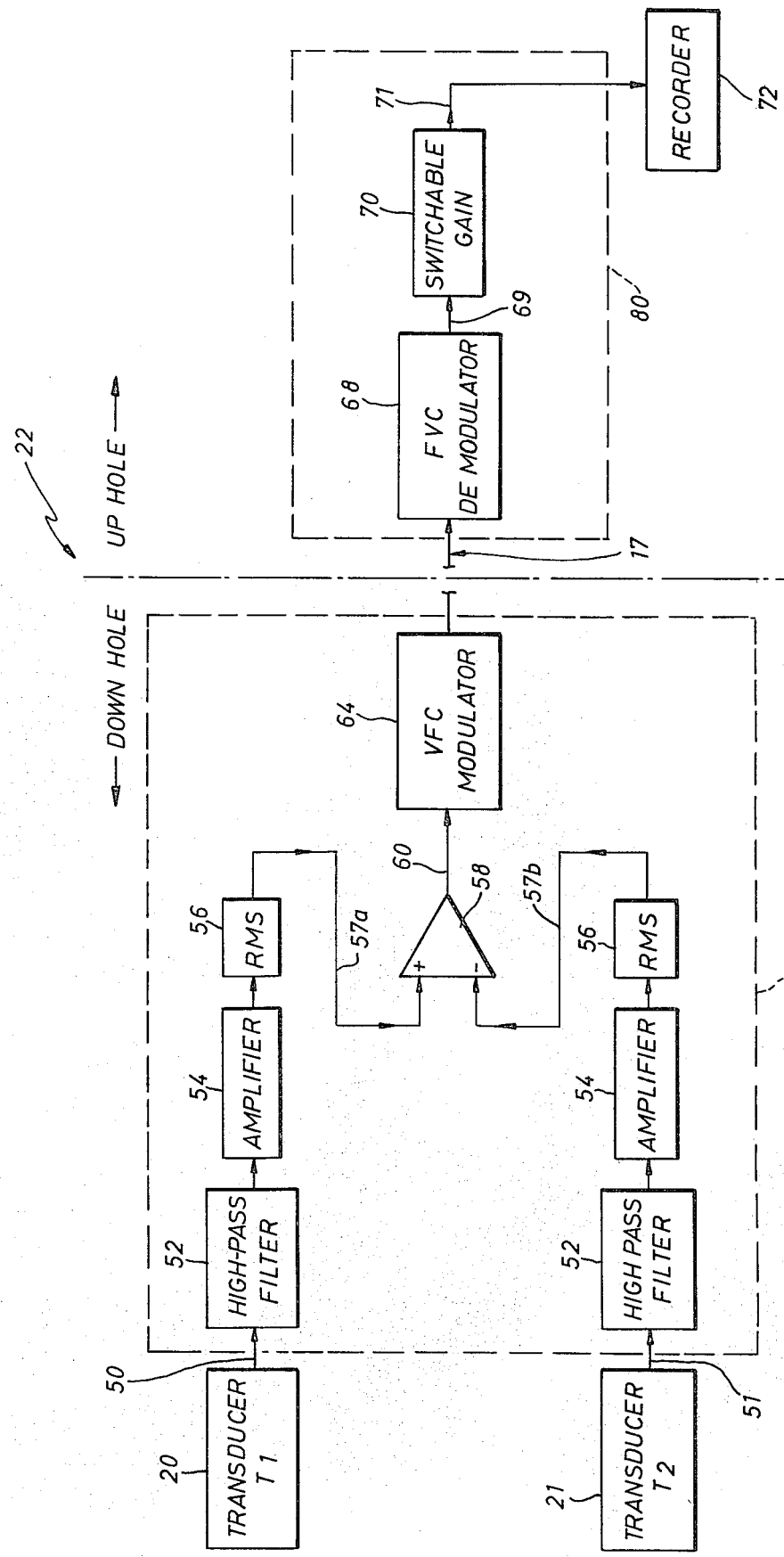

Turning now to FIG. 8 the electronic cartridge 22, indicated in FIG. 1 as connected to sonde 16, is represented in block diagram form. Transducers 20 and 21 of FIG. 1 generate output signals on leads 50 and 51 proportional to acoustic waves generated by any noise source as the sonde 16 is moved through the well. The signals on leads 50 and 51 are applied to filters 52 where preferably frequencies below 10,000 Hz are substantially eliminated. Filtering components of the noise signal having frequencies below 10,000 hertz eliminates a substantial portion of road noise generated by the logging process itself. Output signals from filters 52 are applied to amplifiers 54 for amplification.

After amplification, the signals are applied to root-mean-square (RMS) converter circuits 56. Using the RMS circuits 56 advantageously converts the instantaneous filtered noise signals to an RMS signal proportional to the power remaining in the filtered signal. The conversion to a signal proportional to the power of the noise signal eliminates instantaneous spikes in the signal, which are confusing and would add no useful information if they were recorded on the log. Additionally the RMS conversion, inherently an averaging procedure, serves to further filter road noise signals, thus contributing to the ability to log in a continuous manner. Each RMS signal is applied to separate inputs of differential amplifier 58. The output lead 60 of the differential amplifier 58 is connected to the modulator circuitry 64 for telemetry of the signals uphole via logging cable 17. Circuit 64 is a voltage to frequency converter typical of telemetry systems known in the wireline logging and communication systems.

At the surface the transmitted signal on cable 17 is demodulated by means of a frequency to voltage converter 68 where the differential noise signal is proportional to the difference between the RMS value of high pass filtered transducers. The signal is applied to switchable gain circuit 70 where it is amplified for recording in wireline logging format by recorder 72. The recorder may be of a standard galvanometer type wireline logging recorder or may be magnetic tape, CRT, etc.

I claim:

1. Borehole noise logging apparatus comprising:
   (a) a mandrel adpated for movement along a borehole,
   (b) at least two acoustic transducers cylindrically disposed about said mandrel in an oil filled annulus between the mandrel and a thin tubular metal diaphragm cylindrically surrounding the mandrel, and spaced a predetermined distance from one another for generating electrical noise signals proportional to noise in the borehole at each transducer,
   (c) a rubber covering about the metal diaphragm surrounding each acoustic transducer and extending along a portion of the entire axial extent of each acoustic transducer,
   (d) circuit means for high pass filtering each noise signal and generating respective filtered noise signals, (e) root-mean-square circuit means responsive to the respective filtered noise signals for generating RMS noise signals proportional to the RMS value of each filtered noise signal, (f) differential amplifier means for generating a difference noise signal proportional to the difference between the RMS noise signals, and (g) means for transmitting the difference noise signal to surface instrumentation for recording as a function of depth in the borehole.

2. A method for determining the existence of producing perforations in an interval of a cased borehole comprising the steps of:

(a) traversing the borehole interval with at least two acoustic transducers separated a predetermined distance, (b) generating acoustic transducer noise signal outputs proportional to noise in the borehole at each transducer, (c) generating a differential noise signal from the outputs of the two acoustic transducers by first high pass filtering each signal, then generating a power signal proportional to the power of each filtered signal, and generating a difference noise signal proportional to the arithmetic difference between the power signals and recording the noise difference signal as a function of the depth of the two acoustic transducers in the borehole to produce a log of the difference noise signal versus depth, and (d) generating a doublet pulse on the log at the depth of a known perforation if there is fluid or gas flowing therethrough, the distance between opposite polarity pulses of the doublet being substantially equal to the predetermined distance between the two transducers.

3. A method for distinguishing fluid or gas flow through perforations and fluid flow behind casing in an interval of a cased borehole comprising the steps of:

(a) traversing the borehole interval with at least two acoustic transducers separated a predetermined distance, (b) generating acoustic transducer noise signal outputs proportional to noise in the borehole at each transducer, (c) generating a differential noise signal from the outputs of the two acoustic transducers by first high pass filtering each signal, then generating a power signal proportional to the power of each filtered signal, and generating a difference noise signal proportional to the arithmetic difference between the power signals and recording the noise difference signal as a function of the depth of the two acoustic transducers in the borehole to produce a log of the difference noise signal versus depth, (d) at a location of fluid or gas flow through perforations, generating a doublet pulse on the log, where the doublet pulse is characterized by narrow width pulses, the distance between narrow opposite polarity pulses of the doublet being substantially equal to the predetermined distance between the two transducers, and (e) at a location of fluid flow behind the casing, generating a doublet pulse on the log, where the doublet pulse is characterized by wide width pulses, the distance between wide opposite polarity pulses of the doublet also being substantially equal to the predetermined distance between the two transducers.

4. A method for determining sand entry through a perforation in an interval of a cased borehole from solely fluid or gas entry, comprising the steps of:

(a) traversing the borehole interval with at least two acoustic transducers separated a predetermined distance along the axis of a mandrel, the transducers being cylindrically disposed about a mandrel in an oil filled annulus between the mandrel and a thin tubular metal diaphragm cylindrically surrounding the mandrel, and including a rubber covering about the metal diaphragm surrounding each acoustic transducer and extending substantially the entire axial extent of each acoustic transducer, (b) generating acoustic transducer noise signal outputs proportional to noise in the borehole at each transducer, (c) generating a differential noise signal from the outputs of the two acoustic transducers by first high pass filtering each signal, then generating a power signal proportional to the power of each filtered signal, and generating a difference noise signal proportional to the arithmetic difference between the power signals and recording the noise difference signal as a function of the depth of the two acoustic transducers in the borehole to produce a log of the difference noise signal versus depth, (d) at a location of fluid or gas flow through perforations, generating a doublet pulse on the log where the doublet pulse is characterized by narrow width pulses, the distance between narrow opposite polarity pulses of the doublet being substantially equal to the predetermined distance between the two transducers, and (e) at a location of sand entry through perforations, generating a doublet pulse on the log where the doublet pulse is characterized by narrow width pulses, each pulse of which has a twin peak, the distance between narrow opposite polarity pulses of the doublet being substantially equal to the predetermined distance between the two transducers and the distance between the twin peaks of each pulse being substantially equal to the axial extent of the rubber covering of each acoustic transducer.

5. Borehole noise logging apparatus comprising:

(a) a mandrel adapted for movement along a borehole, (b) at least two acoustic transducers disposed on said mandrel and spaced a predetermined distance from one another for generating an electrical noise signal proportional to the noise in the borehole at each transducer, (c) means associated with said mandrel for acoustically coupling said transducers to one another to and through the fluids in the borehole above, in the vicinity of, and below said mandrel, and for providing for movement of the borehole fluids therepast, (d) noise level circuit means responsive to each noise signal for generating a corresponding noise level signal representative of the power of each said noise signal, (e) differential amplifier means for generating a difference noise signal proportional to the difference between the amplitudes of said noise level signals, and (f) means for transmitting said difference noise signal to surface instrumentation for recording as a function of depth in the borehole.

6. The apparatus of claim 5 wherein said noise level circuit means comprises root-mean-square circuit means for generating RMS noise level signals proportional to the RMS value of each noise signal.

7. The apparatus of claim 5 further comprising circuit means connected between said transducers and said noise level circuit means for high pass filtering each noise signal and generating respective filtered noise signals.

8. The apparatus of claim 5 further comprising:
(a) means including a thin tubular metal diaphragm cylindrically surrounding each said transducer and the portion of said mandrel thereadjacent and defining an oil filled annulus between said mandrel and said diaphragm, and
(b) an elastomeric covering mounted upon and surrounding each said diaphragm in the axial vicinity of each transducer.

9. Borehole noise logging apparatus comprising:
(a) a mandrel adapted for movement along a borehole,
(b) at least two acoustic transducers disposed on said mandrel and spaced a predetermined distance from one another for generating an electrical noise signal proportional to the noise in the borehole at each transducer,
(c) means associated with said mandrel for acoustically coupling said transducers to one another to and through the fluids in the borehole above, in the vicinity of, and below said mandrel, and for providing for movement of the borehole fluids therepast,
(d) circuit means for high pass filtering each noise signal and generating respective filtered noise signals,
(e) root-mean-square circuit means responsive to the respective filtered noise signals for generating RMS noise signals proportional to the RMS value of each filtered noise signal,
(f) differential amplifier means for generating a difference noise signal proportional to the difference between said RMS noise signals,
(g) means for modulating said difference noise signal in the borehole and applying it to a logging cable for transmission to the surface,
(h) means for demodulating said modulated difference noise signal at the surface,
(i) means for recording said demodulated difference noise signal as a function of depth in the borehole,
(j) means including a thin tubular metal diaphragm cylindrically surrounding each said transducer and the portion of said mandrel thereadjacent and defining an oil filled annulus between said mandrel and said diaphragm, and
(k) an elastomeric covering mounted upon and surrounding each said diaphragm in the axial vicinity of each transducer.

* * * * *